United States Patent
Zhao et al.

(10) Patent No.: US 9,609,408 B2
(45) Date of Patent: Mar. 28, 2017

(54) DIRECTIONAL CONTROL OF A VEHICLE MICROPHONE

(71) Applicant: GM Global Technology Operations LLC, Detroit, MI (US)

(72) Inventors: Xufang Zhao, Windsor (CA); Robert D. Sims, III, Milford, MI (US); Md Foezur Rahman Chowdhury, Troy, MI (US); John J. Correia, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 14/294,726

(22) Filed: Jun. 3, 2014

(65) Prior Publication Data
US 2015/0350758 A1    Dec. 3, 2015

(51) Int. Cl.
*H04R 3/00* (2006.01)
*H04R 1/08* (2006.01)
*B60R 16/037* (2006.01)

(52) U.S. Cl.
CPC .............. *H04R 1/08* (2013.01); *H04R 3/005* (2013.01); *B60R 16/037* (2013.01); *H04R 2201/025* (2013.01); *H04R 2430/20* (2013.01); *H04R 2499/13* (2013.01)

(58) Field of Classification Search
CPC .... B60R 16/037; H04R 1/08; H04R 2201/40; H04R 3/005; H04R 2201/025; H04R 2430/20; H04R 2499/13
See application file for complete search history.

(56) References Cited

U.S. PATENT DOCUMENTS

| | | | | |
|---|---|---|---|---|
| 2002/0102002 | A1* | 8/2002 | Gersabeck | B60R 16/0373 381/110 |
| 2005/0027472 | A1* | 2/2005 | Kim | B60R 1/02 702/151 |
| 2006/0145537 | A1* | 7/2006 | Escott | B60R 11/02 307/10.1 |
| 2009/0055180 | A1* | 2/2009 | Coon | B60R 16/0373 704/251 |
| 2010/0208914 | A1* | 8/2010 | Ohtsuka | H04R 3/005 381/86 |
| 2014/0207342 | A1* | 7/2014 | Chen | B60N 2/0248 701/49 |
| 2015/0045988 | A1* | 2/2015 | Gusikhin | B60R 16/037 701/2 |

FOREIGN PATENT DOCUMENTS

| | | | | |
|---|---|---|---|---|
| GB | 2377805 A | * | 1/2003 | ....... B60R 21/01538 |
| JP | 2001352595 A | * | 12/2001 | ............... H04R 3/00 |

* cited by examiner

*Primary Examiner* — Sonia Gay
(74) *Attorney, Agent, or Firm* — Christopher DeVries; Reising Ethington P.C.

(57) ABSTRACT

A hands-free audio system for a vehicle and method of using the system is described. The method includes controlling the directionality of a vehicle microphone. The steps of the method may include: (a) receiving a sensor value from at least one of a vehicle seat position sensor, a vehicle seat orientation sensor, or a vehicle mirror orientation sensor; (b) based on the received sensor value(s) of step (a), determining an origin of a vehicle user's speech; and (c) controlling the microphone sensitivity directionality based on the determined origin.

10 Claims, 5 Drawing Sheets

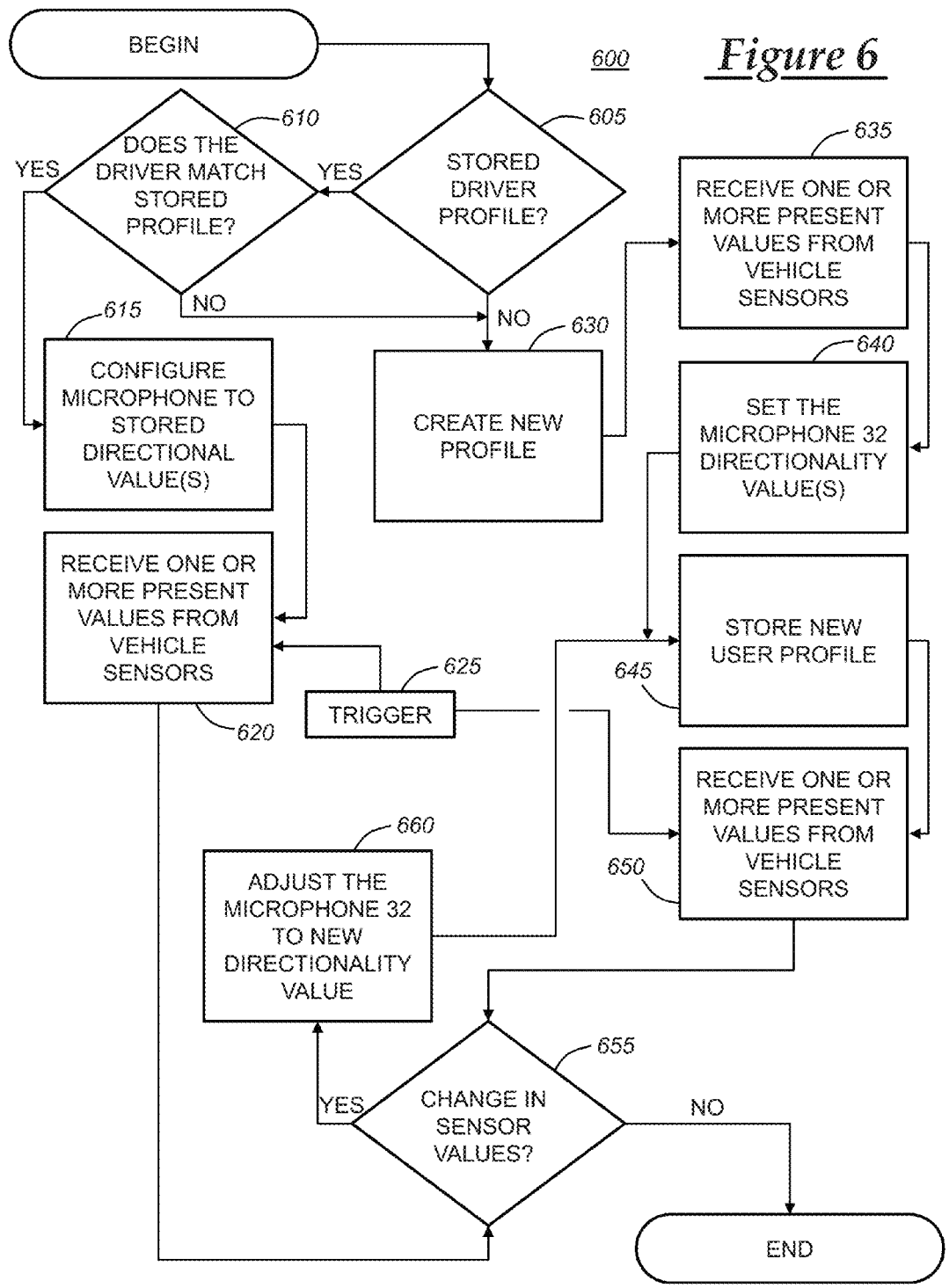

DIRECTIONAL CONTROL OF A VEHICLE MICROPHONE

TECHNICAL FIELD

The present invention relates to a vehicle microphone system, and more particularly to directional control of the vehicle microphone system.

BACKGROUND

In order to improve a vehicle user's driving experience, automotive vehicles may be equipped with a number of hands-free systems. One such system may be a hands-free calling system. The system may include a telematics device for sending and receiving telephone calls, built-in vehicle microphones, and a vehicle sound system having multiple audio speakers. The microphone may receive a driver's voice which is processed and transmitted via the telematics device; further, the other party's voice may be received via the telematics device and audibly provided to the driver via the vehicle speakers. Thus, the driver may be capable of keeping his/her eyes on the road and hands on the wheel while placing an outbound or receiving an inbound call and having a telephone conversation.

SUMMARY

According to an embodiment of the invention, there is provided a method of controlling the directionality of a vehicle microphone. The method may include the steps of: (a) receiving a sensor value from at least one of a vehicle seat position sensor, a vehicle seat orientation sensor, or a vehicle mirror orientation sensor; (b) based on the received sensor value(s) of step (a), determining an origin of a vehicle user's speech; and (c) controlling the microphone sensitivity directionality based on the determined origin.

According to another embodiment of the invention, there is provided a hands-free audio system for a vehicle. The system may include: a vehicle microphone for receiving user speech; at least one vehicle mirror orientation sensor configured to identify an orientation of at least one vehicle mirror; and a processor coupled to memory configured to determine an origin of the user's speech based upon the identified at least one mirror orientation and directionally control the microphone based upon the determination.

BRIEF DESCRIPTION OF THE DRAWINGS

One or more embodiments of the invention will hereinafter be described in conjunction with the appended drawings, wherein like designations denote like elements, and wherein:

FIG. 6 is a flowchart illustrating an illustrative method of controlling the directionality of a microphone using the hands-free audio system shown in FIG. 2.

DETAILED DESCRIPTION OF THE ILLUSTRATED EMBODIMENT(S)

A system and one or more method(s) are described below that pertain to a hands-free audio system in a vehicle. More particularly, the system includes one or more microphone(s) that may be directed to receive speech from a vehicle driver according to an automatic speech recognition (ASR) system. In conventional systems, a fixed microphone may be oriented or otherwise configured to receive speech originating from a fixed spatial location in the vehicle associated with the average location of a driver's head. For example, the microphone may be configured to receive speech from the head of a 50th-percentile driver (i.e., from the head of a human being of the 50th-percentile size)—e.g., determined according to known human factors engineering techniques. In addition, the microphone may be directed at a predetermined height above the driver's seat (e.g., 50 cm). However, the system described below is capable of fine-tuning the directionality of the microphone(s) based on unique physical features of the driver. Thus, for example, instead of providing a microphone with directionality based on a fixed human size, the system provides a microphone directionality that is tailor-able. Moreover, the system does not require the driver to manually adjust the microphone directionality. In at least one embodiment, the directionality is based on a number of input criteria, including input received from a vehicle seat position sensor, a vehicle seat orientation sensor, and/or one or more vehicle mirror orientation sensors.

This system and method are described below with reference to FIGS. 2-6 as they would be used in connection with the mobile vehicle communications system of FIG. 1.

Communications System—

Figure 1:
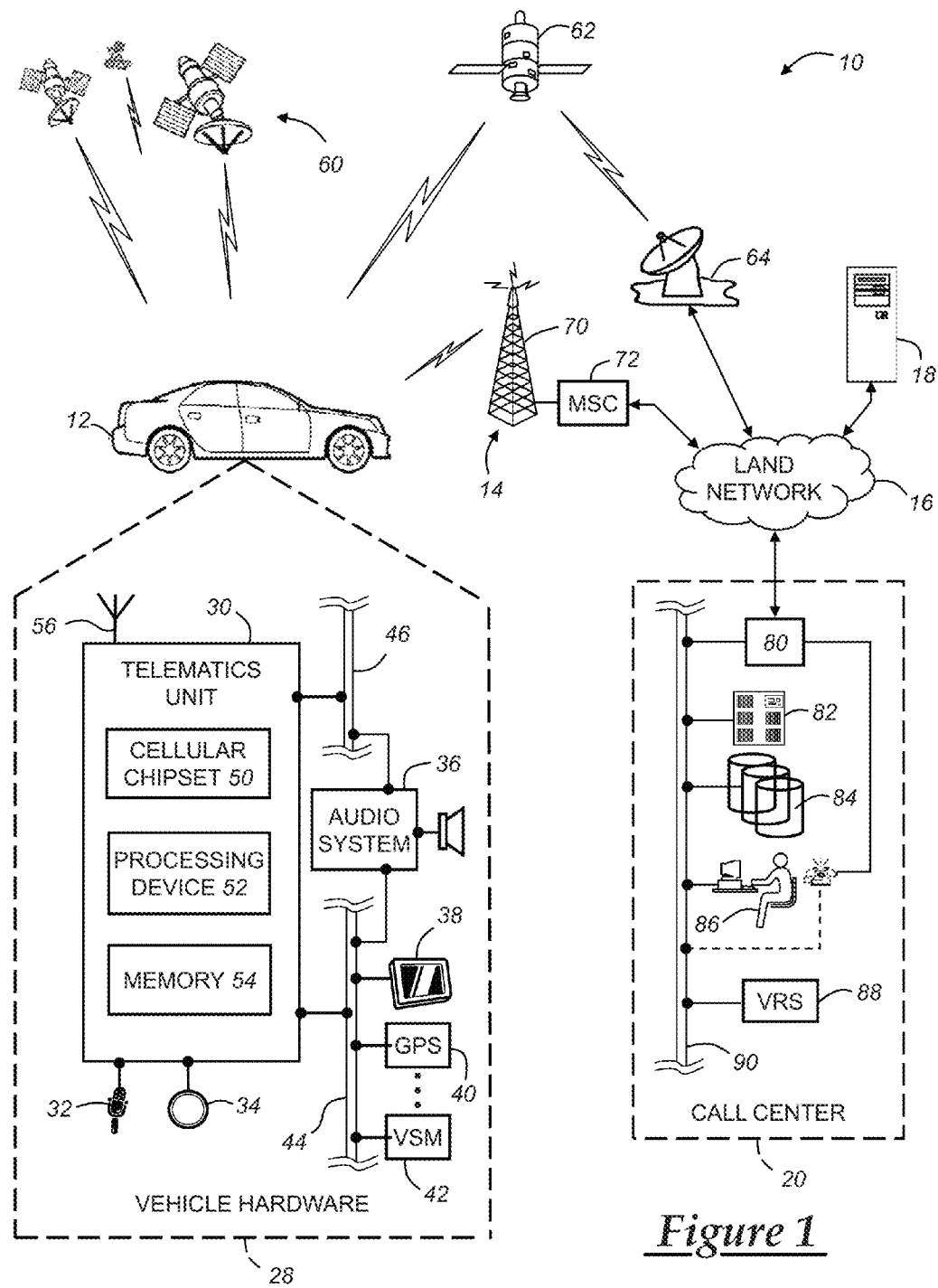
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Figure 2:
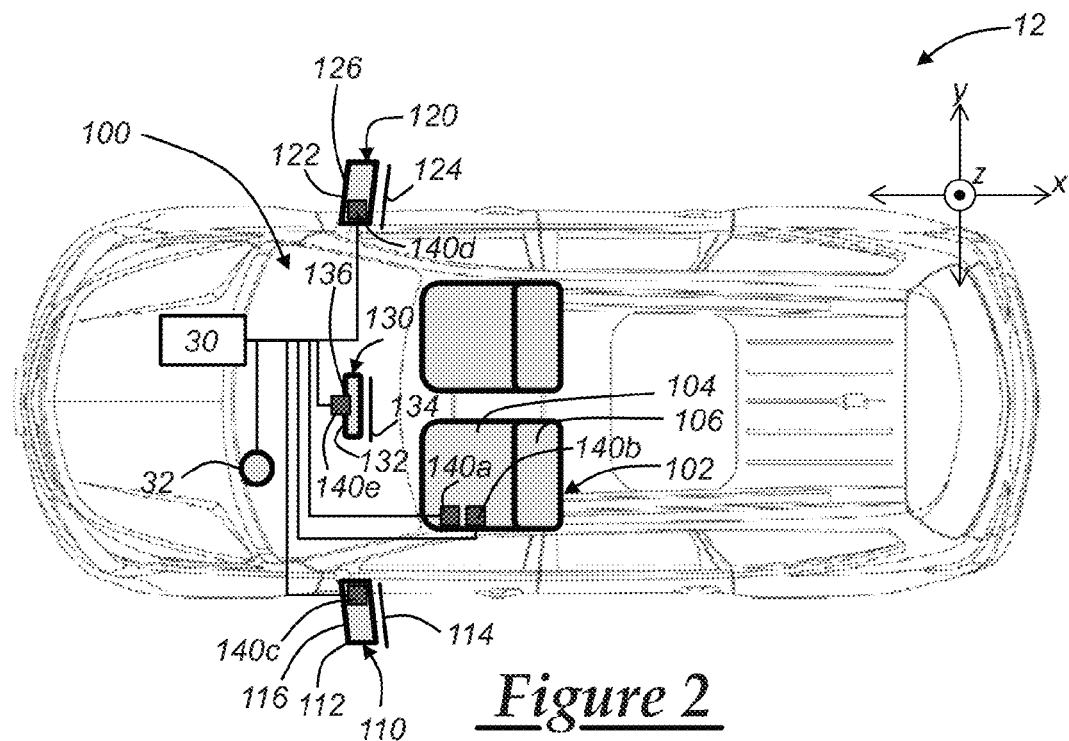
FIG. 2 is a plan view of a vehicle having a hands-free audio system with automatic directional microphone control.

FIG. 2 illustrates a top or plan view of vehicle 12 having a hands-free audio system 100 with automatic directional microphone control electrically coupled to the telematics unit 30 and several vehicle 12 features, including a driver's seat 102 having a seat base 104 coupled at one end to a backrest 106, a driver's side mirror assembly 110 (having a base 112 carrying a mirror 114 and having a reference datum 116), a passenger's side mirror assembly 120 (having a base 122 carrying a mirror 124 and having a reference datum 126), and a driver's rearview mirror assembly 130 (having a base 132 carrying a mirror 134 and having a reference datum 136). The system 100 includes the microphone 32 and one more sensors 140. The sensors 140 may include a seat position sensor 140*a*, a seat orientation sensor 140*b*, a driver-side mirror sensor 140*c*, a passenger-side mirror sensor 140*d*, and a rearview mirror sensor 140*e*, just to name a few examples. The microphone 32 may include a single microphone receiving element or may include multiple microphone receiving elements (e.g., an array or similar configuration).

The seat position sensor 140*a* may be configured to detect the axial or longitudinal displacement (e.g., fore and aft) of the driver's seat base 104 and provide an electrical signal or value indicating the relative position thereof. The seat orientation sensor 140*b* may be configured to detect the angular displacement of the backrest 106 relative to the seat base 104 and provide an electrical signal or value indicating the relative angular orientation thereof. The mirror sensors 140*c*, 140*d*, 140*e* may each be configured to detect the angular orientation of the respective mirrors 114, 124, 134 with respect to the respective reference datums 116, 126, 136, and provide electrical signals or values indicating the relative orientations thereof. The signals may be discretely transmitted between the sensors 140 and the telematics unit 30, or may be transmitted via a bus (e.g., communications bus 44) or other suitable wired or wireless means. In some instances, the reference datums 116, 126, 136 may be associated with or a part of the bases 112, 122, 132.

Returning to FIG. 1, the telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. For example, the sensors 140*a*, 140*b*, 140*c*, 140*d*, 140*e*, etc. may be coupled to a Audio System VSM (AS-VSM) and the AS-VSM 42 may be coupled to the telematics unit 30. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Having described the various elements of the communication system 10, one or more method(s) of using the communication system, specifically the hands-free audio system 100 in the vehicle 12, will be described hereafter.

In general, the system 100 enables automatic directional microphone control tailored to the size of a vehicle user. For example, when a driver enters vehicle 12 (or even thereafter), the directionality of the microphone 32 is fine-tuned based on various input criteria such as the driver's seat position, the driver's seat orientation, and/or the vehicle mirrors' orientation. It should be appreciated that in some Smart vehicles, the telematics unit 30 will recognize a driver's identity automatically upon the driver's entrance to the vehicle; e.g., the driver has a stored profile including stored seat position/orientation, mirror orientation, and optimized microphone direction (e.g., previously determined). To illustrate, the telematics unit 30 may identify the user by recognizing the driver's cellular device (e.g., using an identifier unique to the device such as a MAC address), one or more pressure sensors located at the driver's seat 102 (not shown), etc. In other implementations, the automatic directional microphone control may rely upon the driver adjusting the seat, mirrors, etc.

The automatic directional microphone control may utilize beamforming techniques known to skilled artisans. In general, beamforming is a signal processing technique that may be used to control either the directionality of the reception or transmission of a signal at a source or sink device (e.g., a transducer). Thus, in the present implementations, beamforming should be broadly construed to include any spatial filtering in the time or frequency domains to control (and improve) the audio quality of the driver's voice received at the microphone 32.

FIG. 6 illustrates one illustrative method 600. The method begins with step 605 as the telematics unit 30 checks or determines whether a driver/user profile is stored in the memory 54. The driver profile may not be limited to a stored seat position, a stored seat orientation, a driver side-mirror orientation, a passenger side-mirror orientation, and/or optimized microphone direction. For example, it may further include climate control preferences, entertainment preferences, etc. When at least one stored profile is found, the method 600 proceeds to step 610, and when a stored profile is not found, the method proceeds to step 630 to create a new driver profile.

In step 610, the telematics unit 30 or other suitable device determines whether the driver/user is associated with the stored profile or profiles. Step 610 may include identification of the driver's cellular device as discussed above, the driver manually providing an indication of his/her identity (e.g., via a vehicle head unit), or via any other suitable identification manner known to skilled artisans. If the driver matches one of the stored profiles, the method proceeds to step 615; otherwise, the method 600 proceeds to step 630.

In step 615, the telematics unit 30 may configure the vehicle 12 according to the driver's profile. This may include adjusting the mirrors 114, 124, and/or 134 and the seat position and orientation, as well as configuring the microphone 32 to a stored directional value(s) associated with the driver's physical characteristics and the driver seat position, the driver seat orientation, and/or the mirror orientations. The method by which the directional value(s) is determined will be discussed below.

Following step 615, the method proceeds to step 620 and receives one or more present sensor values from the vehicles sensors 140—e.g., via bus 44. This step may occur continuously, after a predetermined period of time or, in some cases, when triggered (e.g., via step 625).

The trigger step 625 may include any manual or automatic adjustment of the vehicle seat 102 (e.g., a change in the input received at sensors 140a, 140b) or any manual or automatic adjustment of the vehicle mirrors 114, 124, 134 (e.g., a change in the input received at sensors 140c, 140d, 140e). In another example, the trigger step 625 may occur when the audio system 100 is initiated or used (e.g., a hand-free call button is depressed or a voice command button is depressed, e.g., both on a vehicle steering wheel). Or for example, another trigger might be associated with the driver's door opening and/or closing or a change in the driver seat pressure sensors—all indicating another driver may be entering the vehicle. Other triggers and instances also are possible.

Regardless, step 620 may include receiving at the telematics unit at least one sensor value associated with the seat 102 (e.g., the sensor value associated with sensors 140a and/or 140b) and/or at least one sensor value associated with at least one of the mirror assemblies 110, 120, 130 (e.g., sensor values associated with sensors 140c, 140d, and/or 140e). In another embodiment, the telematics unit 30 receives sensor values from each of the seat position sensor 140a, the seat orientation sensor 140b, the driver-side mirror sensor 140c, the passenger-side mirror sensor 140d, and the rearview mirror sensor 140e. These are merely examples; other combinations or sensor values are also possible.

Following step 620, the method 600 proceeds to step 655 to determine whether the present sensor values are the same as the previously implemented sensor values. In this instance of course, the previously implemented sensor values include those stored in the driver's profile that was retrieved from memory 54. Step 655 will be discussed in greater detail below.

Returning now to step 630, the method 600 generates or creates a new profile. The new profile ultimately may or may not be stored in memory 54. For example, profiles not saved may be considered temporary or based on usage, etc. This step may include associating a unique cellular device identifier with the new profile.

Following step 630, in step 635 the telematics unit 30 may receive one or more present values from one or more vehicle sensors 140. Step 635 may essentially be the same as step 620.

After step 635, the method may proceed to step 640 and set a directionality value for the microphone 32. The directionality value is based upon beamforming parameters or a beamforming algorithm or mode which is determined based on the location or three-dimensional coordinates of the driver's mouth or point of utterance or origin. The origin is determined based on at least one or more of the sensor values received from sensors 140.

Figure 3:
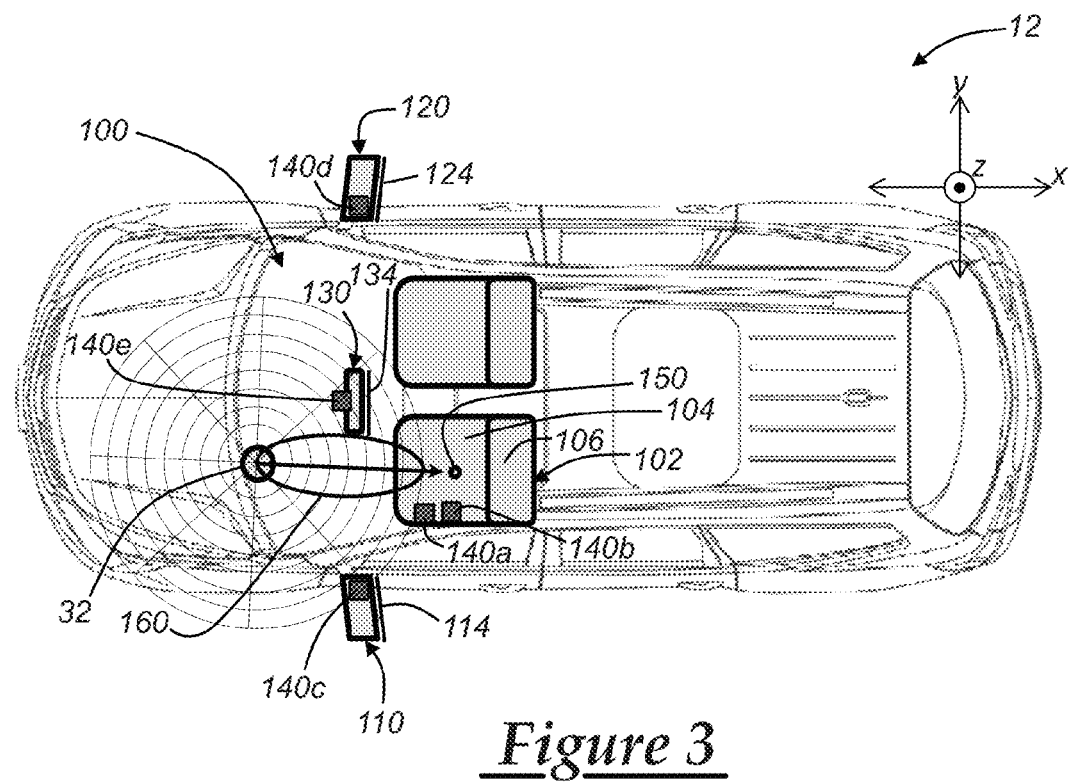
FIG. 3 illustrates a microphone directionality of the hands-free audio system shown in FIG. 2.

As previously discussed, the beamforming mode may direct the sensitivity of the microphone 32 in a general or concentrated direction or lobe—without physically moving or re-orienting the microphone. FIG. 3 illustrates a sensitivity lobe 160 directed at an origin 150 (representing the driver's mouth).

Figure 4A:
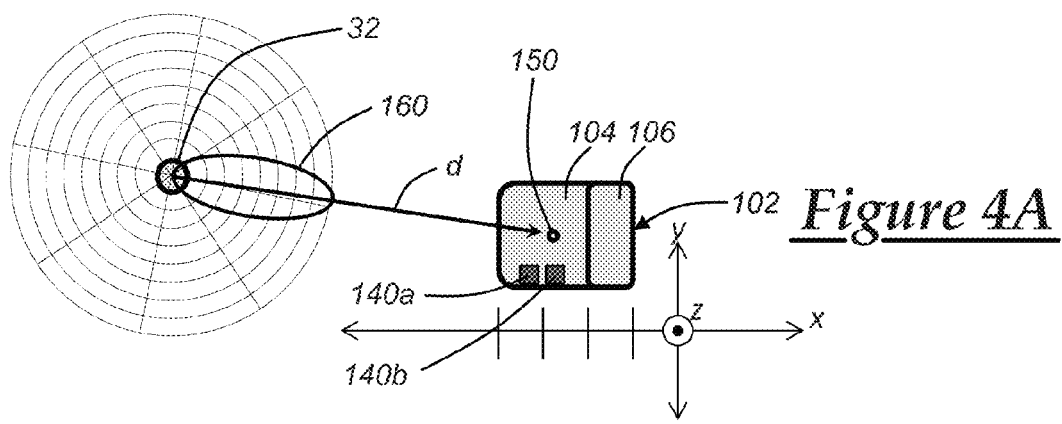
FIG. 4A is a diagrammatic view of a portion of the vehicle and the hands-free audio system shown in FIG. 3.
Figure 4B:
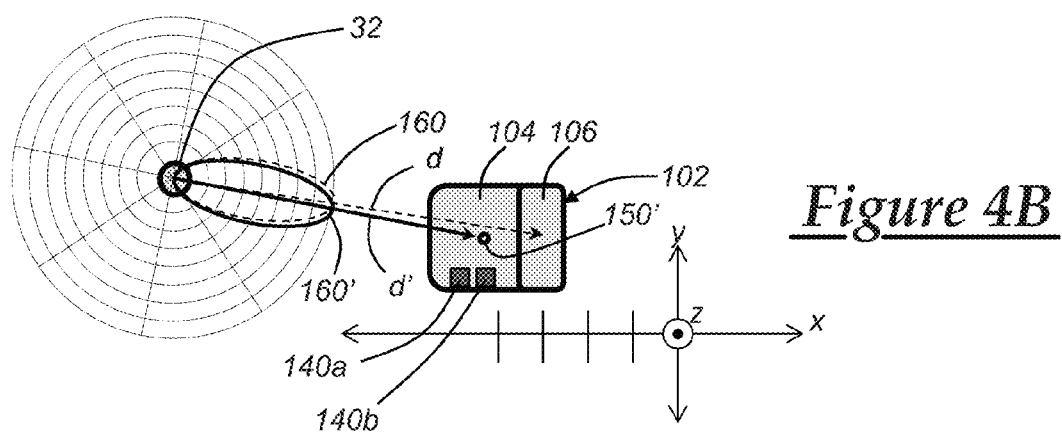
FIG. 4B is another diagrammatic view of a portion of the vehicle and the hands-free audio system shown in FIG. 3.
Figure 5A:
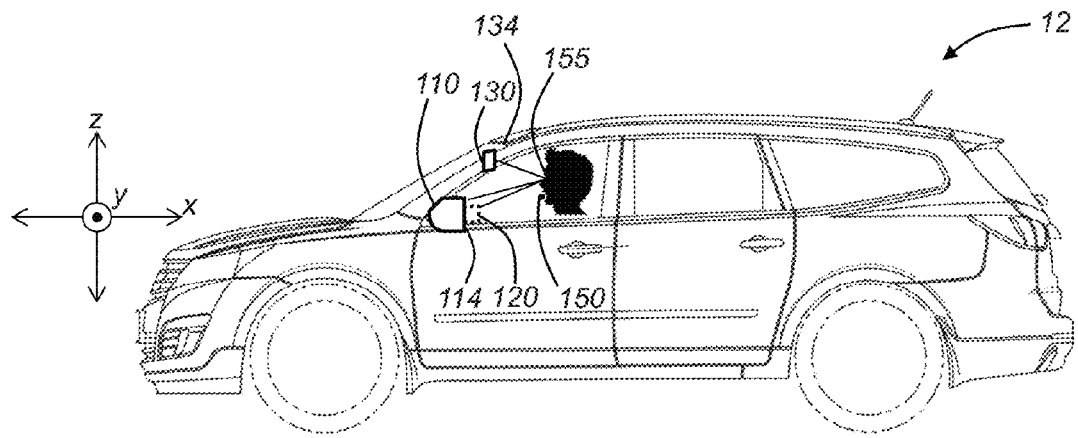
FIG. 5A is an elevational view of the vehicle shown in FIG. 2.
Figure 5B:
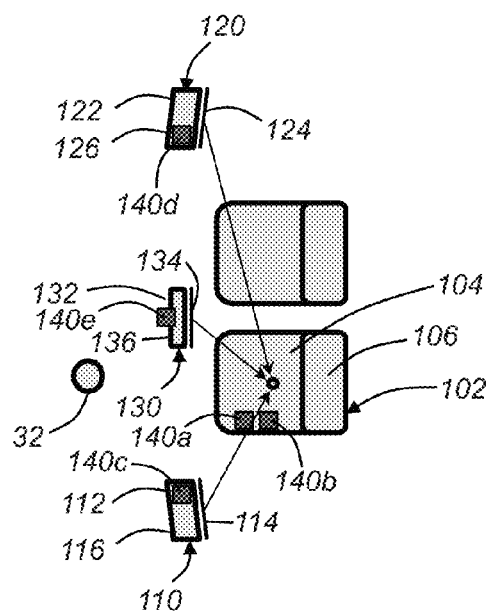
FIG. 5B is another diagrammatic view of a portion of the vehicle and the hands-free audio system shown in FIG. 3.

The origin 150 may be referenced to a known location in the vehicle 12 (e.g., the location of the microphone 32) and may be derived using sensor values obtained from the sensors 140. For example, the x-y-z coordinates of the origin 150 may be derived from the seat's 102 relative position and/or orientation as well as the mirror assemblies 110, 120, 130. FIGS. 4A and 4B illustrate the seat 102 in different axial positions (e.g., different fore and aft positions)—e.g., along an x-axis. And the origin 150 (x-y coordinates) may be derived or locally estimated using both the seat position and/or seat orientation. FIGS. 5A and 5B illustrate the mirrors 114, 124, 134 angled relative to the driver's head, more specifically, angled relative to the driver's eyes. Thus, the orientation of the mirrors 114, 124, 134 individually and/or collectively may be correlated to a line-of-sight (LOS) region 155 spaced just above the origin 150 (x-z coordinates). Using the LOS region 155 and known human factors (e.g., average or mean spacing between human eyes and the human mouth), the origin 150 (x-y-z coordinates) may be at least partially identified (or even solely identified thereby). Thus when at least some of the values from sensors 140 are considered and calculated (e.g., by the processor 52 of the telematics unit), three-dimensional coordinates of the origin 150 may be derived. And once the origin 150 (x-y-z coordinates) is identified, the directionality value of the microphone 32 may be determined and configured according to the appropriate beamforming parameters thereby better enhancing audio quality.

It will be appreciated that this determination may be the same or similar to that assumed to be previously conducted in order to have stored the driver's profile (step 605); furthermore, it will be this directionality value(s) that will enable the performance of configuring the microphone 32 in step 615.

And thus after step 640, the new directionality value may be stored in a new user profile in step 645. Of course, other values may be stored including the seat position/orientation, mirror orientation, etc., as previously described.

According to method 600, step 650 may follow thereafter. In step 650, the telematics unit 30 may receive one more present values from the vehicle sensors 140. This step may be similar to that described in step 620. Moreover, step 650 may or may not be triggered via step 625.

Following step 650 (and step 620 as previously discussed), step 655 may determine whether the present (or instantaneously obtained) sensor values have changed from those previously implemented. For example, the method 600 may determine whether the driver changed the mirror orientations, seat position and/or seat orientation, etc. If a change is determined, the method may proceed to step 660; otherwise, the method 600 may end.

In step 660, the telematics unit 30 may adjust the beamforming parameters according to the known techniques discussed above in step 640 (e.g., to a second beamforming mode). Together, FIGS. 4A and 4B illustrate that by simply moving the seat 102 fore or aft, the origin 150 may change. For example, both FIGS. 4A and 4B illustrate the seat 102 in different fore/aft positions (see the x-axis in both figures). In FIG. 4A, the arrow d indicates the directionality of the microphone 32 and its corresponding sensitivity lobe 160. As shown in FIG. 4B, the origin has changed; origin 150' is shifted vehicle forward—the dashed arrow d indicating the previous origin 150 and the solid arrow d' indicating the new origin 150'. Thus, when the seat 102 is moved forward, the beamforming parameters associated with the lobe 160' in FIG. 4B will result in better microphone 32 performance. This is merely an illustrative example. After step 660, the method proceeds again to step 645 (which may proceed as previously described).

The described method 600 has utilized processing device 52 of the telematics unit 30 to perform the logic computations, calculations, algorithms, etc.; however, it should appreciated that another processor or processing device could also be used. For example, a processor dedicated to the hands-free audio system 100 or a processor in a vehicle head unit, etc.).

Alternative embodiments also exist. For example, the determination of a change in the sensor values in step 655 may require the values to be identical or within a predetermined tolerance. For example, if the seat position sensor has 30 incremental positions fore and aft (e.g., position 1, position 2, ... position 29, position 30), and the previous stored value indicated position 15 while the present value indicated position 16, a tolerance of '3 positions' might result in step 655 determining 'a match' or 'no change' (as position 15 is within 3 positions of position 16). Similarly, the sensor values from the seat orientation sensor 140b and those associated with the mirror assemblies (i.e., sensors 140c, 140d, 140e) may be an identical match or within a predetermined tolerance as well.

Another alternative embodiment includes a steerable microphone. For example, the previous embodiments describe the microphone 32 in a fixed arrangement using beamforming to control the microphone's sensitivity; however, the microphone 32 may be movable or adjustable as well—in accordance with the one or more sensor inputs or values (e.g., from sensors 140a, 140b, 140c, 140d, 140e, etc.). Or for example, a combination of microphone steering and beamforming may be used.

The method(s) may be performed as one or more computer programs executable by one or more computing devices of or in communication with a vehicle telematics system to cause the system and/or the computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

In one embodiment, the performed method(s) include computer programs executable using the telematics unit processor 52 and memory 54. For example, the processor 52 may execute instructions that receive input from sensors 140, determine an origin based on that sensor input, and directionally control a microphone's reception sensitivity after determining the origin (e.g., using beamforming techniques and/or physically steering the microphone). When determining the origin, the performed method(s) may include other parameters known to skilled artisans, including ambient noise, vehicle acoustic parameters, etc.

Thus there has been described a hands-free audio system capable of tailoring or fine-tuning the directionality of a microphone or microphone array based on the determined position or location of a driver's head and mouth. Further, the described system receives one more vehicle sensor input(s) and derives or otherwise identifies the position based on the sensor input(s). Further, the present disclosure includes one or more methods of tuning the microphone directionality based upon different and/or changing drivers.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling directionality of a single vehicle microphone, comprising the steps of:
creating a user profile stored in a vehicle, comprising:
receiving at least one sensor output at a processor of a vehicle system module (VSM), wherein the at least one sensor output is associated with a directional position of a vehicle mirror, wherein the vehicle mirror is associated with a user of the vehicle in a driver's seat;
using the at least one sensor output that is associated with the directional position of the vehicle mirror, determining at the processor an origin of user speech associated with the user;
based on the determined origin of user speech, determining at the processor a directional setting of the single vehicle microphone that concentrates a sensitivity of that single microphone at the origin of user speech, wherein the directional setting is adapted to improve automatic speech recognition; and
storing in memory the directional setting as part of the user profile;
receiving at the VSM a trigger associated with applying the stored user profile; and
in response to receiving the trigger, applying the directional setting stored in the user profile in order to control the directionality of only the single vehicle microphone.

2. The method of claim 1, further comprising:
when the user later re-enters the driver's seat, identifying the user;
selecting the previously-created user profile associated with the user;
retrieving from memory the directional setting associated with the user profile; and then
controlling the directionality of the single vehicle microphone based on the directional setting to improve automatic speech recognition.

3. The method of claim 1, further comprising creating and storing in VSM memory a plurality of user profiles for different users of the vehicle, and further comprising: selecting one of the plurality of user profiles each time one of the users enters the driver's seat, wherein each of the plurality of user profiles is created based on the position of the vehicle mirror when the respective user is in the driver's seat.

4. The method of claim 1, wherein, when creating the user profile, the step of receiving at least one sensor output further comprises receiving a plurality of sensor outputs at the processor, wherein each of the plurality of sensor outputs are associated with a different vehicle mirror and each respective vehicle mirror's directional position with respect to the user in the driver' seat.

5. The method of claim 4, wherein the different vehicle mirrors include at least two of a vehicle rear-view mirror within a vehicle cabin, a driver's side mirror, and a passenger's side mirror.

6. The method of claim 1, wherein controlling the directionality of the one vehicle microphone further comprises panning and/or tilting the single vehicle microphone.

7. The method of claim 1, wherein the step of receiving at least one sensor output further includes receiving sensor output associated with a driver's seat position, wherein the determined origin of user speech comprises using sensor output associated with both the driver's seat position and the at least one vehicle mirror.

8. The method of claim 1, further comprising: after the user profile is stored in memory and while the user remains seated in the driver' seat, re-determining the origin of user speech based on a trigger event.

9. The method of claim 8, wherein the trigger event includes receiving an indication at the processor of a change in the directional position of the vehicle mirror or receiving an indication of a change in a position or an orientation of the driver's seat.

10. A method of controlling a directionality of a single vehicle microphone, comprising the steps of:
   creating a user profile stored in a vehicle, comprising:
      receiving at least one sensor output at a processor of a vehicle system module (VSM), wherein the at least one sensor output is associated with a directional position of a vehicle mirror, wherein the vehicle mirror is associated with a user of the vehicle in a driver's seat;
   using the at least one sensor output that is associated with the directional position of the vehicle mirror, determining at the processor an origin of user speech associated with the user;
   based on the determined origin of user speech, determining at the processor a directional setting of a single vehicle microphone that concentrates a sensitivity of that single vehicle microphone at the origin of user speech, wherein the directional setting is adapted to improve automatic speech recognition; and
   storing in memory the directional setting as part of the user profile;
receiving a signal at the VSM via a user interface in the vehicle, wherein the signal indicates a user actuation at the user interface, wherein the signal commands the VSM to apply the directional setting stored in the user profile; and
in response to receiving the signal, applying the directional setting stored in the user profile in order to control the directionality of only the single vehicle microphone.

* * * * *